(12) United States Patent
Mizuno

(10) Patent No.: US 6,922,056 B2
(45) Date of Patent: Jul. 26, 2005

(54) BORE LOCATION SYSTEM

(75) Inventor: Morio Mizuno, Higashi-machi (JP)

(73) Assignee: Merlin Technology, Inc., Renton, WA (US)

( * ) Notice: Subject to any disclaimer, the term of this patent is extended or adjusted under 35 U.S.C. 154(b) by 0 days.

(21) Appl. No.: 10/792,559

(22) Filed: Mar. 3, 2004

(65) Prior Publication Data
US 2004/0164740 A1 Aug. 26, 2004

Related U.S. Application Data

(60) Continuation of application No. 10/437,138, filed on May 13, 2003, now Pat. No. 6,717,410, which is a division of application No. 09/657,678, filed on Sep. 8, 2000, now abandoned.

(51) Int. Cl.⁷ .............................................. G01V 3/10
(52) U.S. Cl. ...................................... 324/326; 324/345
(58) Field of Search ........................... 324/326, 66, 67, 324/226, 227, 202, 225, 239, 329, 345; 175/62, 45; 343/718

(56) References Cited

U.S. PATENT DOCUMENTS

| | | | |
|---|---|---|---|
| 3,617,865 A | 11/1971 | Hakata | |
| 3,656,161 A | 4/1972 | MacPherson | |
| 3,906,504 A | 9/1975 | Guster et al. | |
| 4,054,881 A | 10/1977 | Raab | |
| 4,314,251 A | 2/1982 | Raab | |
| 4,390,836 A | 6/1983 | Bruce et al. | |
| 4,542,344 A | 9/1985 | Darelek et al. | |
| 4,646,277 A | 2/1987 | Bridges et al. | |
| 4,710,708 A | 12/1987 | Rorden et al. | |
| 4,720,681 A | 1/1988 | Sinclair | |
| 4,806,869 A | 2/1989 | Chau et al. | |
| 4,875,014 A | 10/1989 | Roberts et al. | |
| 4,881,083 A | 11/1989 | Chau et al. | |
| 5,174,033 A | 12/1992 | Rider | |
| 5,337,002 A | 8/1994 | Mercer | |
| 5,363,926 A | 11/1994 | Mizuno | |
| 5,469,155 A | 11/1995 | Archambeault et al. | |
| 5,513,710 A | 5/1996 | Kuckes | |
| 5,585,726 A | 12/1996 | Chau | |
| 5,711,381 A | 1/1998 | Archambeault et al. | |
| 5,764,062 A | 6/1998 | Mercer | |
| 5,920,194 A | 7/1999 | Lewis et al. | |
| 6,035,951 A | 3/2000 | Mercer | |
| 6,079,506 A | 6/2000 | Mercer | |
| 6,102,136 A | 8/2000 | Archambeault et al. | |
| 6,427,784 B1 | 8/2002 | Archambeault et al. | |
| 6,459,266 B1 | 10/2002 | Fling | |
| 6,717,410 B2 * | 4/2004 | Mizuno | 324/326 |

FOREIGN PATENT DOCUMENTS

| | | |
|---|---|---|
| JP | 62-115670 | 11/1988 |
| WO | WO 0146554 | 6/2001 |

* cited by examiner

Primary Examiner—Jay Patidar
Assistant Examiner—Reena Aurora
(74) Attorney, Agent, or Firm—Michael Pritzkau

(57) ABSTRACT

A system and method for locating a horizontal bore below a ground surface includes a transmitting source configured to radiate from the bore a dipole magnetic field aligned with the bore. A receiver is located remote from the transmitting source and has a first coil and a second coil. Each coil defines an axis, wherein the axes of the first coil and the second coil are orthogonal to each other. A measurement device is in communication with the coils and configured to measure the phase of signals induced on the coils by the magnetic field when the axis of the first coil is horizontally perpendicular to the axis of the magnetic field and the axis of the second coil is vertically perpendicular to the axis of the magnetic field. The measurement device is also configured to determine the lateral position of the transmitting source relative to the coils responsively to the phase of the signals on the first coil and the second coil.

8 Claims, 17 Drawing Sheets

BORE LOCATION SYSTEM

This application is a continuation application of patent application Ser. No. 10/437,138 filed on May 13, 2003, now U.S. Pat. No. 6,717,410, which is a divisional application of patent application Ser. No. 09/657,678 filed Sep. 8, 2000, which is now abandoned, the disclosures of which are incorporated herein by reference.

BACKGROUND OF THE INVENTION

The present invention relates generally to underground bore location systems.

Those of ordinary skill in the art should recognize that the term "horizontal bore" refers to the excavation of a hole, typically for utilities, through the ground and to the excavated hole itself. The present invention relates to systems and methods for locating such bores, but also to such systems and methods for locating existing buried utilities, whether such existing utilities were initially installed by boring or trenching techniques. Accordingly, unless otherwise indicated, the term "bore" as used herein refers to new bores and to existing buried utilities or similar lines.

Boring location systems are utilized in a variety of circumstances. For example, in horizontal boring systems as are typically used for installing utilities, it is desirable to maintain a directional boring head in a desired boring path and to avoid known obstacles such as existing utilities. Accordingly, systems are known to trace existing utilities from an above-ground position.

The boring head, which may include a boring probe behind a drill head, is underground and is therefore not visible to the operator. Accordingly, the boring probe may be configured to transmit signals from the bore that provide location information to an above-ground operator. One system that is configured to determine whether an underground boring probe is laterally offset from its intended horizontal path is described in U.S. Pat. No. 4,881,083, the entire disclosure of which is incorporated herein by reference. This information is used, in turn, to maintain the boring head in its desired path. Typically, however, an above-ground receiver must be disposed at a known location relative to the boring head with respect to the head's desired path of travel in order to properly read certain location information. For example, assume that a boring head is to the right of its desired path and that an above-ground receiver is disposed along the path in an attempt to receive location information from which to determine whether the boring head should turn to the right or to the left to regain or maintain its path. Using one conventional receiver, the operator must know whether the boring head is ahead of or behind the above-ground receiver with respect to the desired path.

SUMMARY OF THE INVENTION

The present invention recognizes and addresses disadvantages of prior art constructions and methods. Accordingly, it is an object of the present invention to provide an improved bore location system.

This and other objects are achieved by a system for locating a horizontal bore below a ground surface. The system includes a transmitting source configured to radiate from the bore a dipole magnetic field aligned with the bore. A receiver includes a first coil and a second coil, the axis of each coil being orthogonal to the axis of each other coil. A measurement device in communication with the coils is configured to measure the phase of signals induced in the coils by the magnetic field when the axis of the first coil is horizontally perpendicular to the axis of the magnetic field and the axis of the second coil is vertically perpendicular to the axis of the magnetic field and to determine the lateral position of the transmitting source relative to the coils responsively to the phase of the signals induced on the two coils.

A method according to the present invention for locating a horizontal bore below a ground surface includes providing a transmitting source in the bore and radiating from the bore a dipole magnetic field aligned with the bore. A receiver having first and second orthogonally aligned receiver coils is disposed remotely from the bore so that the dipole magnetic field induces a signal in each coil. A measurement device determines the phase of the induced signal of each coil when the axis of the first coil is horizontally perpendicular to the magnetic field axis and the axis of the second coil is vertically perpendicular to the magnetic field axis. The measurement device determines the lateral position of the transmitting source relative to the coils responsively to the phases of the first and second coils.

BRIEF DESCRIPTION OF THE DRAWINGS

A fall and enabling disclosure of the present invention, including the best mode thereof, directed to one of ordinary skill in the art, is set forth more particularly in the remainder of the specification, which makes reference to the appended drawings, in which.

Figure 1:
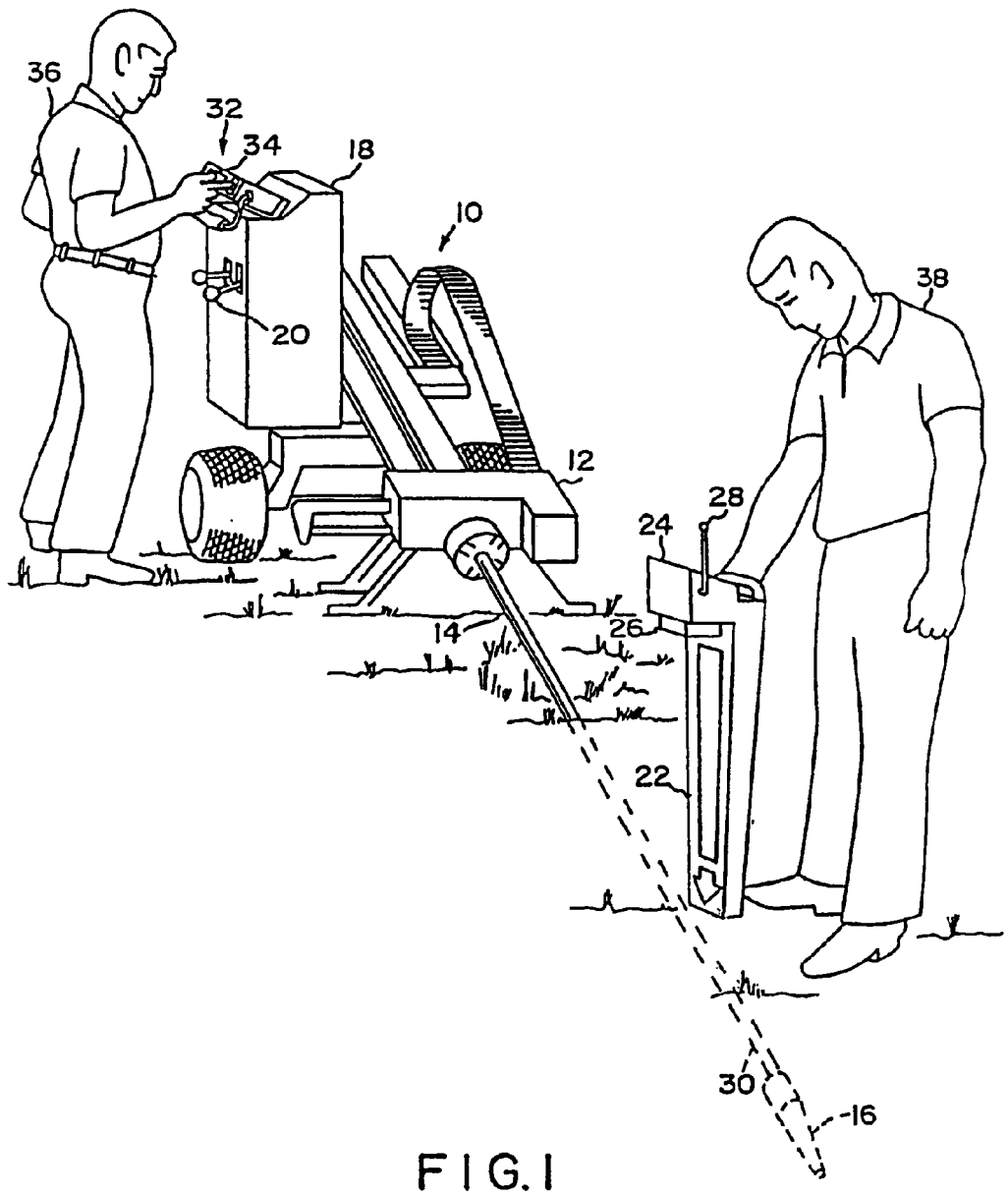
FIG. 1 is a perspective view of a wireless remote boring system in accordance with an embodiment of the present invention.

Repeat use of reference characters in the present specification and drawings is intended to represent same or analogous features or elements of the invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a directional boring device 10 in accordance with an embodiment of the present invention. A boring machine 12 is located in an initial position and includes a boring rod 14 and a directional boring head 16. The boring machine includes a control panel 18 with actuators 20 for controlling operation of the boring device. A means for wireless receipt of location signals from a transmitting source includes a receiver 22. Receiver 22 includes a display 24 and the means for wireless transmission from the receiver device of information received from the transmitting source to a remote monitor device. As embodied herein, the means for wireless transmission includes a wireless transmitter 26 with an antenna 28.

A signal generating probe 30 is located generally adjacent boring head 16 for emitting location signals containing information about the boring device as will be discussed in more detail below. The guidance system further includes a remote monitoring device 32 located generally adjacent to boring machine 12 for receiving the transmitted information from transmitter 26 via wireless transmission. Remote monitor 32 includes a display 34 so that the operator 36 of the boring device can see and/or hear the information transmitted from transmitter 26.

Accordingly, a workman 38 at a distant location from the boring machine 12 utilizes receiver 22 to receive a location signal from signal generating probe 30, which signal contains information with respect to the boring head 16. Such information may be, for example, its location, its depth below the ground, its pitch, its angular position or roll, its temperature, and/or the remaining battery life of the probe. This information is received by receiver 22 as will be described in more detail below and is processed on display 24 at this location.

Substantially simultaneously and in real time, transmitter 26 transmits signals carrying the information that is displayed on display 24 to the monitor 32 via wireless transmission. Remote monitor 32 processes these signals and displays them on display 34. Both data and image signals may be transmitted between the wireless transmitter and remote monitor 32. Thus, operator 36 at the boring device is able to obtain real time information with respect to the boring head just as workman 38 is able to obtain this information at the location of the boring head. The particular mechanisms for accomplishing this with respect to a preferred embodiment are described in more detail below.

Figure 11A:
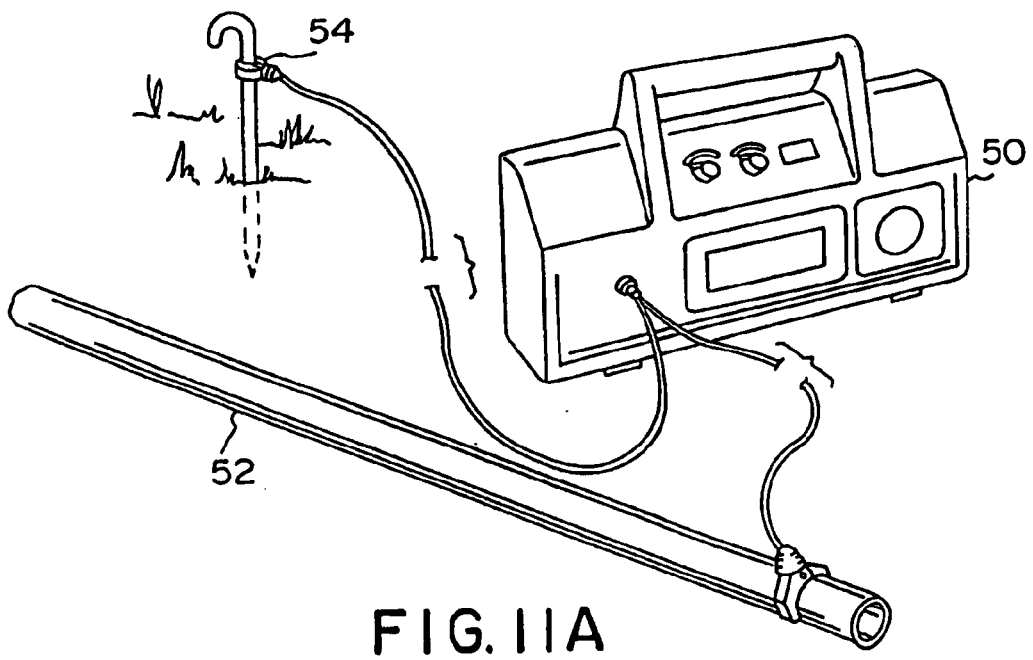
FIG. 11A is a perspective view of a transmitting source in accordance with an embodiment of the present invention.

The system may also be used to locate existing utilities. For example, referring to FIG. 11A, transmitting source 50 radiates a location signal from utility 52 located within the bore. Cables from transmitting source 50 are clipped directly to buried utility 52 and to ground at 54. AC current carries along the length of the conductor and returns through a grounded stake to transmitter 50, providing a signal loop. Current strength displayed on both transmitter 50 and receiver 22 is at its maximum as receiver 22 moves directly over and traces the utility. Receiver 22 may indicate the maximum current by audible or visual means, thereby indicating the lateral position of the horizontal bore with respect to the receiver device. Thus, an operator carrying a portable receiver device can move to his left or right until the receiver device is approximately directly above the utility.

Faults can be detected by current fluctuation. A microprocessor within receiver 22 rejects the depth reading when receiver 22 strays over other utilities in the area by indicating "DETECTING ERROR" on the visual display. Current strength is adjustable to avoid bleeding onto other utilities in congested areas, and to "power-up" for a longer located in areas where no other utilities are present. One transmitting source configured to operate as described above and below is the SpotDTek® marketed by McLaughlin Manufacturing Company, Inc. of Greenville, S.C.

Figure 11B:
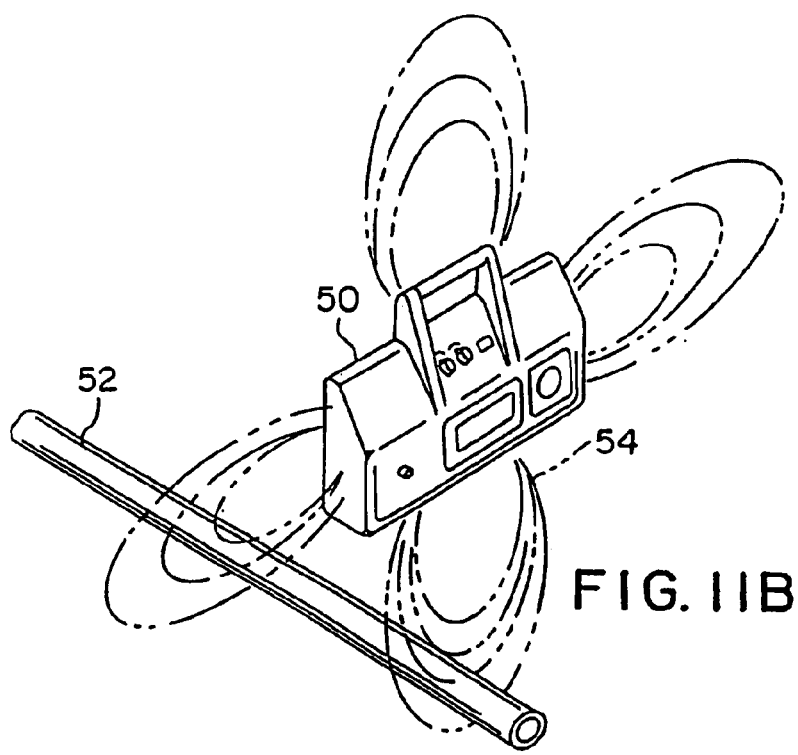
FIG. 11B is a perspective view of a transmitting source in accordance with an embodiment of the present invention.

Transmitter 50 may also be configured to indirectly generate the location signal when a direct connection to the utility is impractical. For example, referring to FIG. 11B, transmitter 50 is placed on the ground surface in an upright position above the utility 52. Transmitter 50 emits a varying magnetic field 54 to generate a current along utility 52 which, in turn, induces a magnetic field along the length of utility 52. Accordingly, receiver 22 may detect the location signal. Using the McLaughlin SpotDTek®, this indirect mode is effective for utilities buried at depths of 6.5 feet or less and produces a location signal detectable up to 200 feet. As in the direct connection mode, "DETECTING ERROR" will be displayed if receiver 22 picks up other utilities in the area. The current induction strength is adjustable in this mode to tune out other utilities in congested areas. Current readout on the digital display also detects faults as receiver 22 is moved along the surface.

Figure 11C:
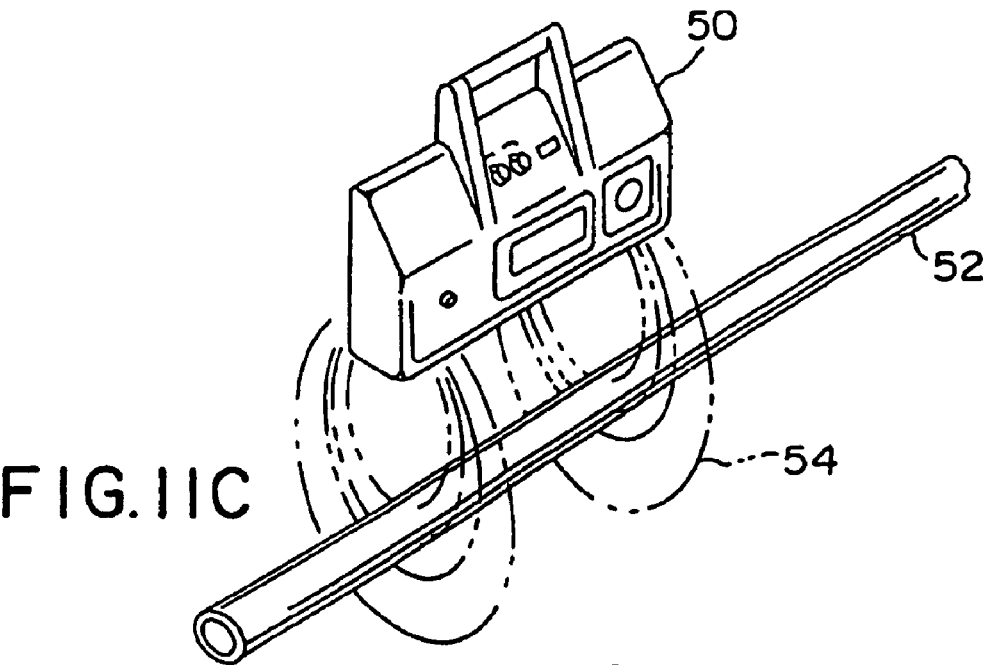
FIG. 11C is a perspective view of a transmitting source in accordance with an embodiment of the present invention.

Referring now to FIG. 11C, for depths between 6.5 and 16 feet transmitter 50 is placed over utility 52. A strong signal 54 is generated by twin coils, and high AC power provides an effective detection range of over 1,000 feet. As in the short span indirect mode, current strength can be fine-tuned so that other utilities and faults may be readily detected.

Figure 11D:
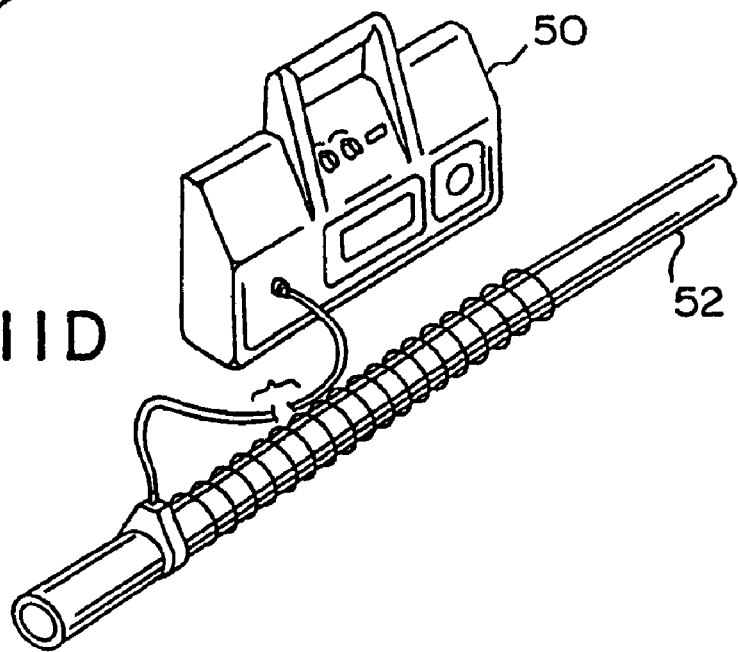
FIG. 11D is a perspective view of a transmitting source in accordance with an embodiment of the present invention.

Referring to FIG. 11D, a coil clamp can be used on metallic lines or to induce a signal through PVC lines. The coil lamp does not have to close around the conductor. It need only be placed on and parallel to the utility 52. The SpotDTek® external coil mode has a detection range of over 1,000 feet.

Figure 12:
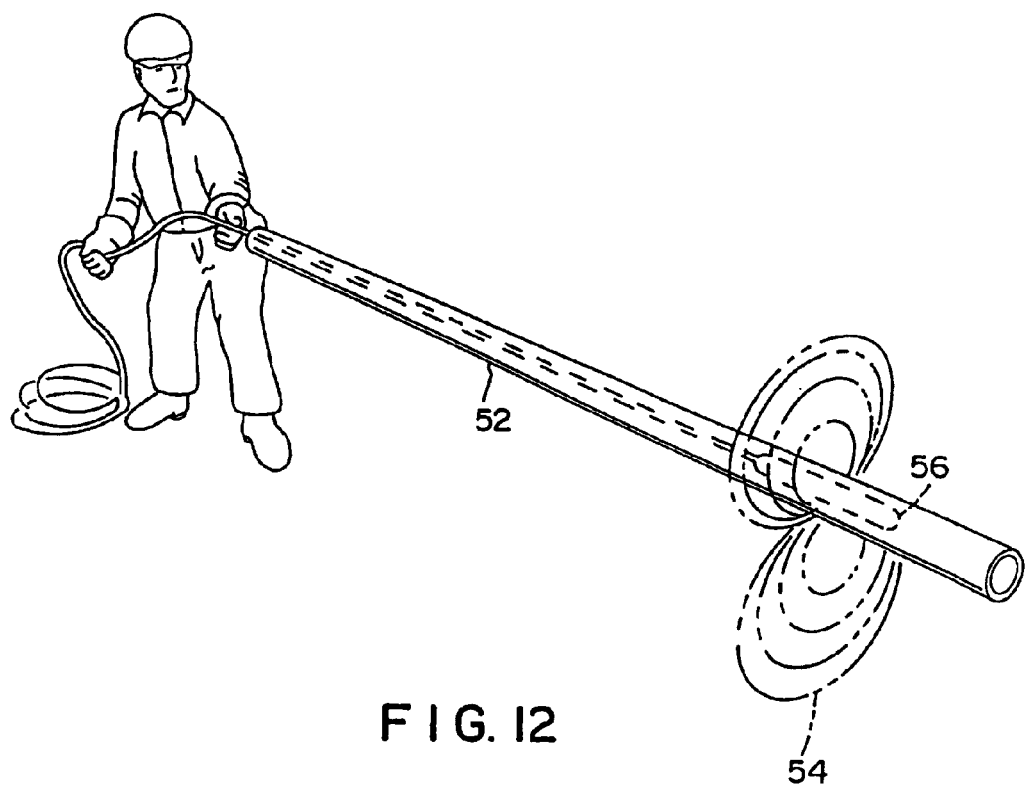
FIG. 12 is a schematic illustration of a transmitting source in accordance with an embodiment of the present invention.

The above-described methods for detecting an existing utility involve radiating a location signal from a metallic utility. Referring to FIG. 12, a transmitting source for use with nonmetallic pipe includes a battery operated transmitter probe 56 inserted in PVC or other nonmetallic pipe having a 1" or larger internal diameter. Probe 56 emits a magnetic location signal 54 that is received by a receiver 22 which traces the progress of probe 56 as it is routed through the utility 52.

Furthermore, the transmitting source may be simply the utility itself. For example, power and telecommunication lines emit their own electromagnetic radiation, which may be used as location signals. Thus, receiver 22 may trace these utilities while detecting the self-emitted location signal. The SpotDTek® device may be programmed, for example, for three passive frequencies, 50–60 Hz for live power and 13–17 KHz and 18–22 KHz for two radio frequencies. Thus, such utilities may be located without the need of signal inducement as long as current is flowing on the lines.

It should also be understood that the receiver 22 may be stationary. For example, the present invention could be utilized in bore homing systems like those disclosed in Chau et al., U.S. Pat. No. 4,881,083 and Bridges et al., U.S. Pat. No. 4,646,277. Furthermore, as will be apparent to those of ordinary skill in the art, a variety of suitable apparatus and methods may be employed to radiate a location signal from a bore, to receive the location signal and to determine the depth of the bore responsively to the received location signal.

Thus, for example, the receiver may be a fixed device or a portable device carried by an operator to trace a new or existing bore. Similarly, the depth measurement device may measure bore depth in a variety of ways. For example, depth may be measured by determination of a field gradient of a received location signal, as a function of the pitch angle of a directional boring head or through the procedures described below. Furthermore, the measurement device may be an independent device or a device embodied by other system components, for example the receiver.

Accordingly, all suitable apparatus and methods for accomplishing the present invention should be understood to be in the scope and spirit of the present invention. For ease of explanation, however, the remainder of the specification will address an exemplary preferred embodiment for use with a directional boring system as shown in FIG. 1. It should be understood that such an example is provided by way of illustration only and not in limitation of the invention.

Figure 2A:
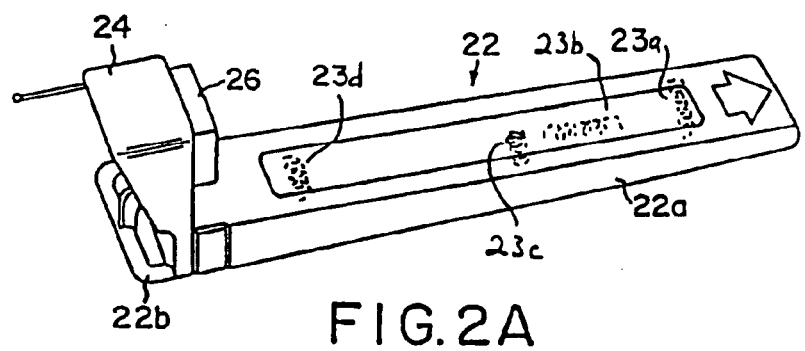
FIG. 2A is a perspective view of a receiver/transmitter in accordance with an embodiment of the present invention.
Figure 2B:
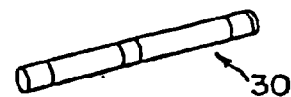
FIG. 2B is a perspective view of a signal generating probe.

FIGS. 2A and 2B illustrate receiver 22 and signal generating probe 30. Receiver 22 includes a longitudinally extended plastic casing 22a which houses the receiving mechanism. Integrated with housing 22a is a display 24 and a handle 22b for positioning the receiver. Attached to the receiver is a wireless transmitter 26 whose operation will be described in more detail with respect to FIG. 5. Of course, transmitter 26 may be incorporated within the receiver unit. Housing 22a includes a plurality of horizontally spaced apart coils 23a, 23b, 23c and 23d (shown in Phantom in FIG. 2a) for receiving signals from the signal generating probe 30.

Signal generating probe 30 generates a magnetic field that contains information with respect to the probe that is indicative of the boring head 16. Prior to operation, the system is calibrated to this field to permit subsequent depth measurements. At calibration, an operator activates a calibration mode of operation at the receiver and places probe 30 ten feet from the receiver, laterally aligned with and parallel to coil 23a. In calibration mode, the receiver only measures the strength of the signal on coil 23a induced by the probe's radiated magnetic field. Receiver 22 (FIG. 5) stores this value (hereinafter "$V_1$") in an EEPROM or other suitable memory at the receiver. Additionally, or alternatively, the receiver may transmit $V_1$ to memory a monitor 32.

To determine the probe's depth during operation, the operator carries receiver 22 as shown in FIG. 1 and positions the receiver so that coil 23a is parallel to the probe's actual or intended path of travel. In a depth-reading mode, the receiver measures only the strength of the signal on coil 23a induced by the probe's radiated magnetic field and stores this value (hereinafter "$V_2$") to memory at the receiver and/or monitor 32. A CPU at the receiver determines the probe's depth by the following equation:

$$depth = 10\ ft(V_1/V_2)^{-3}$$

This value is displayed at displays 24 and 34.

It should be understood that depth may be calculated in any suitable manner. Thus, for example, coils 23a and 23d may utilize the field gradient of the magnetic field from the signal generator to generate information as to the location and depth of the boring head as disclosed in U.S. Pat. No. 3,617,865 dated Nov. 2, 1971, the disclosure of which is incorporated herein by reference in its entirety. For example, to measure the distance of an existing underground utility in an arrangement as shown in FIGS. 11A–11D or 12, the operator may place the receiver above the utility so that parallel coils 23a and 223d are perpendicular to the underground utility. In a depth-reading mode, the receiver measures only the strength of the signals on coils 23a and 23d induced by the magnetic field radiated from the utility. Assuming that the magnitude of these signals are $V_1$ and $V_2$, respectively, the receiver stores these values in its memory. The distance L between coils 23a and 23d is known and is also stored in the receiver's memory. The depth X between coil 23a and the existing utility is:

$$X = L(V_2/(V_1 - V_2))$$

Figure 9:
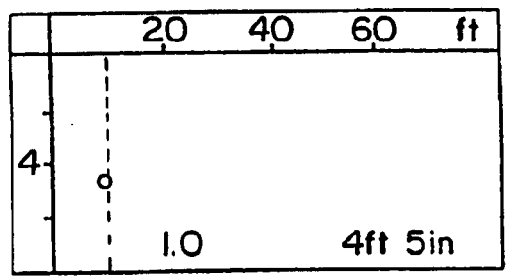
FIG. 9 is an exemplary visual display of a receiver and/or monitor device in accordance with an embodiment of the present invention.

It should also be understood that the control of coils 23a, 23b, 23c and 23d may be affected in any suitable means. For example, a CPU in the receiver may control the selection of coil outputs to an amplification and filter circuit, as shown in FIG. 9 of U.S. Pat. No. 5,363,926, the entire disclosure of which is incorporated by reference herein.

Figure 14A:
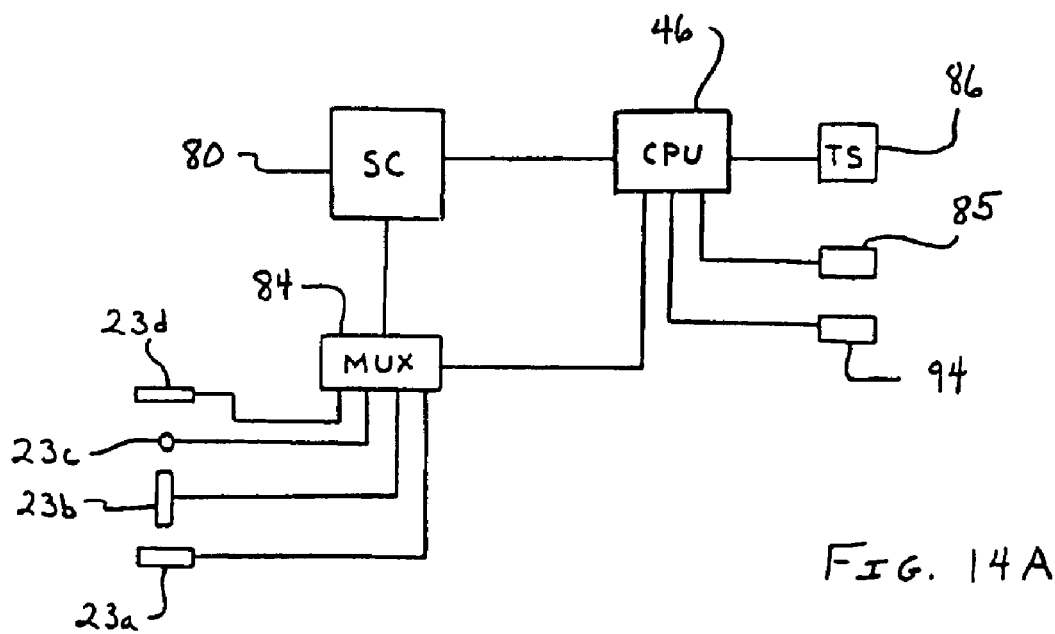
FIG. 14A is a schematic illustration of control circuitry for use in an embodiment of the present invention.
Figure 19A:
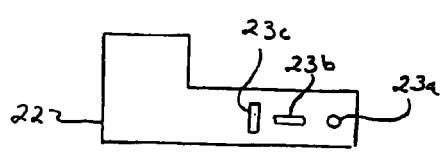
FIG. 19A is a schematic illustration of a receiver in accordance with an embodiment of the present invention.
Figure 19B:
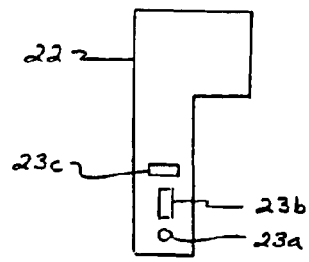
FIG. 19B is a schematic illustration of a receive in accordance with an embodiment of the present invention.
Figure 19C:
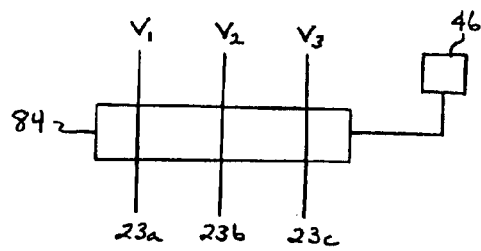
FIG. 19C is a schematic illustration of a multiplexer and CPU for use in a receiver constructed in accordance with an embodiment of the present invention.
Figure 19D:
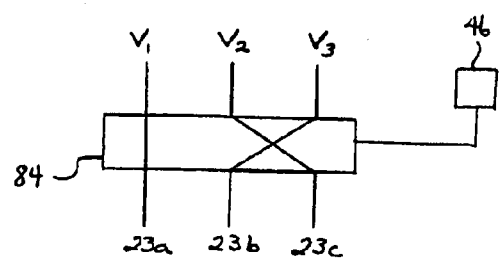
FIG. 19D is a schematic illustration of a multiplexer and CPU for use in a receiver constructed in accordance with an embodiment of the present invention.

Furthermore, referring to FIG. 14A, the output signals from coils 23a, 23b, and 23c may be directed to a signal conditioning circuit 80 (as shown in FIG. 9 of the '926 patent) and the receiver's CPU, indicated at 46, through a multiplexer 84 controlled by CPU 46 so that the receiver may operate whether in a vertical or horizontal position. Referring to FIGS. 19A and 19B, coils 23b and 23c reverse their orientation with respect to a horizontal ground surface when receiver 22 is moved from a horizontal to a vertical position. The CPU, which reads a tilt switch 86 (FIG. 14A), controls multiplexer 84 to direct the coil signals to the appropriate outputs depending on the receiver's position. Referring also to FIGS. 19C and 19D, when the tilt switch indicates that the receiver is in a horizontal position as shown FIG. 19A, the CPU controls the multiplexer to direct the signals on coils 23a, 23b, and 23c to outputs $V_1$, $V_2$, and, $V_3$, respectively. When the receiver is moved to a vertical position as shown in FIG. 19B, the output signal from tilt switch 86 changes state, and the CPU therefore switches the multiplexer so that the signals on coils 23b and 23c are directed to outputs $V_3$ and $V_2$, respectively, as shown FIG. 19D. Thus, the receiver automatically operates the same whether the receiver is laid flat on the ground or held in a vertical position by the operator.

Figure 14B:
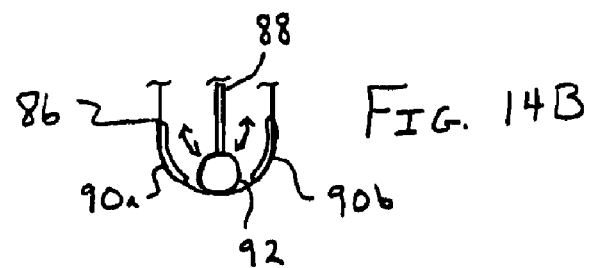
FIG. 14B is a schematic illustration of a tilt switch as shown in FIG. 14A.

The tilt switch may be of any suitable construction, for example a mercury switch or a mechanical switch shown in FIG. 14B. The tilt switch includes a first lead 88 and two second leads 90a and 90b and may be disposed in receiver 22 (FIG. 1) so that when the receiver is placed horizontally on the ground, a metal ball 92 rolls between lead 86 and lead 90a, completing a circuit that delivers a signal to CPU 46. Responsively to this signal, the CPU connects the coil signals to signal conditioning circuit 80 through multiplexer 84 as shown in FIG. 19C. When the receiver reaches about 30°–40° from the horizontal position to the vertical position, however, ball 92 rolls into position between leads 88 and 90b. This causes the CPU to switch the multiplexer so that the coil signals are directed to the signal conditioning circuit as shown in FIG. 19D.

In a preferred embodiment, the frequency of the signal output by the signal generator is approximately 38 KHz. Any suitable frequency may be utilized, such as, for example, 1.2 KHz, 9.5 KHz, 114 KHz, etc.

Figure 4:
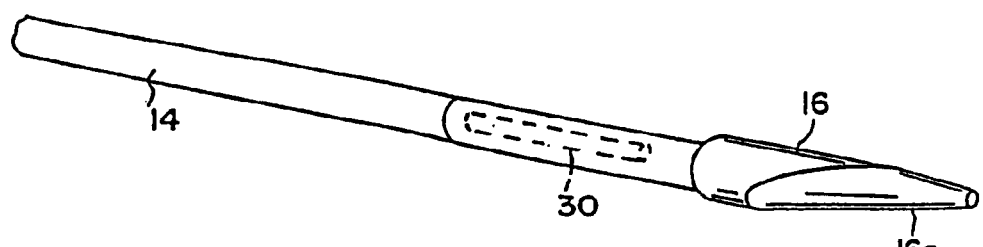
FIG. 4 is a perspective view of a directional boring head associated with a signal generating probe and drill rod.

Probe 30 in a preferred embodiment includes a ferromagnetic core with copper windings on which an electrical current is placed to generate a dipole magnetic field that is received by receiver 22. Probe 30 may be of varying types depending on the application desired and may be capable of providing a variety of types of information. Mercury switches may be provided in a probe 30 around its inside perimeter so as to indicate the angular position or roll of the boring head. When the boring head is rotated to a particular position, the appropriate mercury switches close and, therefore, angular position information is generated. As is indicated in FIG. 4, a directional boring head 16 has a sloped portion 16a for controlling the direction of the boring head in conjunction with the propulsion of the boring machine. With information as to the angular location of the sloped portion 16a, the boring head can be oriented to proceed in a desired direction. This is referred to herein as the roll of the directional boring head.

In addition, probe 30 may contain a cradle-type switch for indicating the pitch above or below a horizontal plane or a plane parallel to the surface of the ground at which the directional boring head is located. Finally, indicators may be contained in the boring head and probe to indicate the battery life remaining in the probe or signal generator as well as the temperature of the boring head. All of this information may be conveyed to the receiver through the magnetic field generated by the signal generator, as described in U.S. Pat. No. 5,363,926 referenced above. In one preferred embodiment, the mercury switch and cradle switch are replaced by respective accelerometers. It should be understood, however, that the particular mechanism used to modulate the magnetic field to carry the pitch, roll, temperature and battery life information is not essential to the present invention and that any suitable arrangement may be used.

Figure 7:
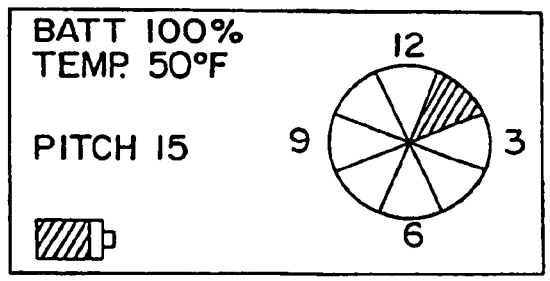
FIG. 7 is an exemplary visual display of a receiver and/or monitor device in accordance with an embodiment of the present invention.
Figure 8:
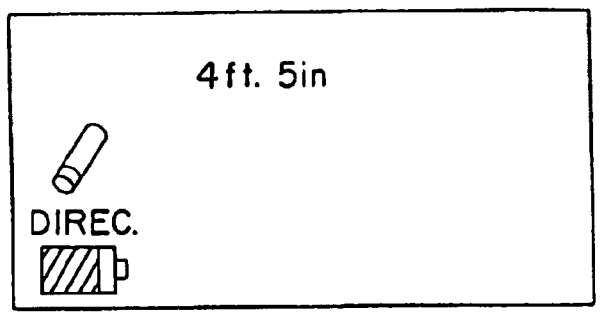
FIG. 8 is an exemplary visual display of a receiver and/or monitor device in accordance with an embodiment of the present invention.

FIGS. 7, 8 and 9 illustrate possible visual displays of the receiver 22 and/or monitor 32. The display as in FIG. 7 illustrates the direction of the tapered surface 16a and pitch angle of boring head 16. The display in FIG. 8 illustrates the depth of the boring head at a particular instance.

Figure 3:
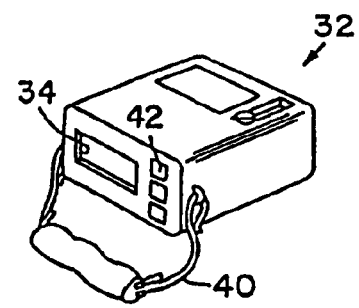
FIG. 3 is a perspective view of a remote receiver/display in accordance with an embodiment of the present invention.

FIG. 3 illustrates a more detailed view of remote monitor 32. Remote monitor 32 may be held around the neck of operator 36 by strap 40 or mounted to boring machine 12 in any suitable fashion. Monitor 32 contains a display 34 for displaying the information received from wireless transmitter 26. Display 34 is capable of displaying information identical to the information displayed on display 24 so that the operator 36 of the boring machine will have the same information as the operator 38 located at the boring head. In a preferred embodiment, display 34, as well as display 24, includes a clock face readout (FIG. 7) for indicating the angular position or roll of the boring head in quadrants, as well as indicators for the remaining information as discussed above. It should be understood that a graphic or visual display is one referred form of display, but within the meaning of "display" or "indicate" as used herein, a voice or audio synthesizer could be substituted or other appropriate audible tones sufficient to convey the appropriate information to the operator. In addition, remote receiver 32 includes a touch pad control panel 42 for selecting the desired information to be displayed, adjusting the volume of the audible signal, or for other purposes as would be apparent to one skilled in the art. Display 24 has similar controls.

Referring to FIG. 4, directional boring head 16 includes a sloped or bent surface 16a for assisting in the directional propulsion of the boring head as described above. Boring head 16 is connected through boring rod 14 to boring machine 12. A component of the boring rod 14 contains a compartment into which the signal generating probe 30 may be inserted for generating the appropriate signals to convey the information with respect to the boring head as described above. As will be understood by those of ordinary skill in the art, as the boring head 16 advances through the bore, additional boring rods are added by operator 36. Thus, the progression of the boring head 16, and therefore the length of the bore, may be determined in terms of the number of boring rods expended.

Figure 5:
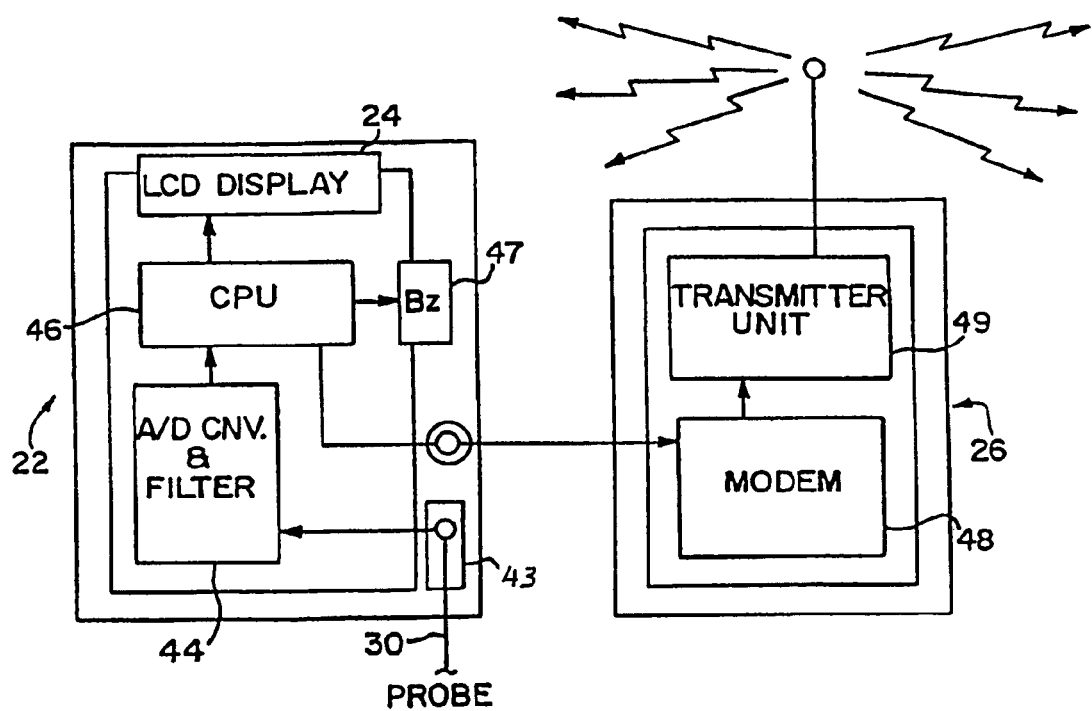
FIG. 5 is a block diagram illustrating the operation of a receiver/transmitter unit in accordance with an embodiment of the present invention.

Referring to FIG. 5, a block diagram is illustrated providing the operational characteristics of receiver 22 and wireless transmitter 26 to one skilled in the art. As illustrated, receiver 22 receives a signal generated by signal generating probe 30 via magnetic field as described above. For receipt of pitch, roll, battery life and temperature information, the receiver relies on coil 23a, represented at 43 in FIG. 5. The signal received by coil 43 is filtered and converted from an analog signal to a digital signal at 44. The digital signal is then processed in a central processing unit 46 to generate the appropriate audible signal as illustrated at speaker 47 and the appropriate visual signal through display 24. The conversion of the received signals from the probe to a visual display and audible output as illustrated in FIG. 5 is done in a conventional manner as would be apparent to one skilled in the art and illustrated, for example, at FIG. 9 in U.S. Pat. No. 5,363,926 referenced above. One example of a known commercial product suitable for this function is the Micro Computerized Pipe Locator marketed by McLaughlin Manufacturing Co., Inc., 2006 Perimeter Road, Greenville, S.C. 29605.

In accordance with the present invention, central processing unit 46 simultaneously and in real time conveys a signal representative of the information displayed on display 24 and sent to audible means 47 to wireless transmitter 26. Wireless transmitter 26 includes a frequency shift keyed modem 48 for receiving the signal from a central processing unit 46 and a transmitter chip 49 for transmitting the signal via wireless means to remote monitor 32. In a preferred embodiment, the digital signal is transmitted between receiver 22 and transmitter 26 at 1200 bits per second. Also, in a preferred embodiment, between modem 48 and transmitter 49, the "1" component of the digital signal is transmitted on a frequency of 1500 Hz and the "0" component of the digital signal is transmitted at approximately 2100 Hz. Of course, these are by way of example only.

Wireless transmitter 26 is capable of transmitting data and image signals and may be of any conventional type wireless transmitter with such capabilities. In a preferred embodiment, wireless transmitter 26 has selectable bands and transmits on a frequency of 469.50 MHz or 469.550 MHz with an output power of 18 milliwatts. Of course, these are by way of example only. In a preferred embodiment, the transmitter circuit corresponds to the Federal Communications Commission Standard no. ID-APVO29O. The wireless transmitter is capable of transmitting both data and image signals and transmits the signals to the remote monitor 32 substantially simultaneously with the display on display 24, thereby providing real time information to the operator 36 of the boring machine 12.

Figure 6:
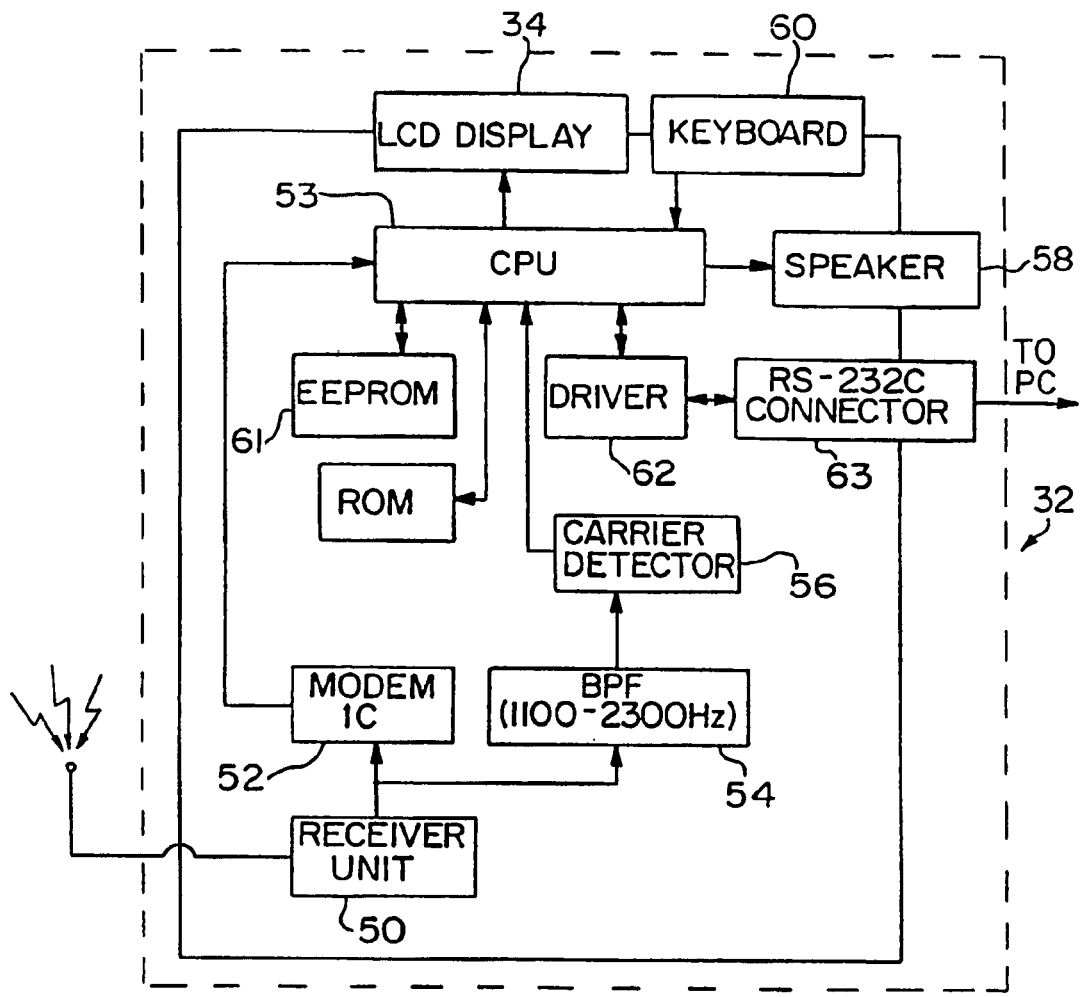
FIG. 6 is a block diagram illustrating the operation of a remote receiver unit in accordance with an embodiment of the present invention.

Referring to FIG. 6, the signal transmitted by wireless transmitter 26 is received by remote monitor 32 at receiver unit 50. Receiver unit 50 receives on the same frequency at which transmitter 49 transmits. In a preferred embodiment, such frequency is 469.50 MHz or 469.550 MHz. The circuitry utilized in remote monitor 32 also corresponds to FCC Standard ID-APVO29O. The signal received at 50 is transmitted via frequency shift keyed modem 52 to central processing unit 53. In a preferred embodiment, this is an eight-bit signal and represents the display and audio components of the signal transmitted to monitor 32. A band pass filter 54 and carrier detector 56 may be utilized to filter and enhance the signal provided to the central processing unit 53. The filter 54 may filter signals, for example outside of a range of 1100 to 2300 Hz. In this embodiment, carrier detector 56 provides a one—bit signal to central processing unit 53 as to whether a radio wave is sending or not, and this controls the receipt by the central processing unit 53. The signal between receiver unit 50 and band pass filter 54 is conveyed as described above with respect to the signal between modem 48 and transmitter 49 with respect to the frequencies. The central processing unit 53 processes the signal to produce an image on display 34 as well as an audible component, if desired via, speaker 58. It should be appreciated that both transmitter 26 and monitor 32 may be of conventional design for the wireless transmission of data and the image signals, the particulars of which are not essential to the present invention.

As discussed above, receiver 22 is also a measurement device capable of measuring the depth of the probe below the ground surface. This information is transmitted to, and received by, monitor 32 as discussed above. Thus, referring to FIG. 9, display 34 indicates the depth of the boring head 16 at a particular selected location. In this embodiment, a depth of four feet five inches is indicated at a distance of one rod length, where one rod is equal to ten feet. Operator 36 may record this information by depressing an appropriate key on keyboard 60, causing CPU 53 to store the depth data associated with the appropriate rod length in EEPROM 61. As each additional rod is expended, operator 36 may cause CPU 53 to record the depth data received by receiver 22. CPU 53 has been preprogrammed by operator 36 via keyboard 60 prior to the boring operation to receive depth data in intervals of expended rods where each rod length is equal to ten feet. Accordingly, when operator 36 depresses a "SET" key on keyboard 60, the current depth measurement at CPU 53 is automatically stored in EEPROM 61 and associated with the current cumulative rod number.

Figure 10:
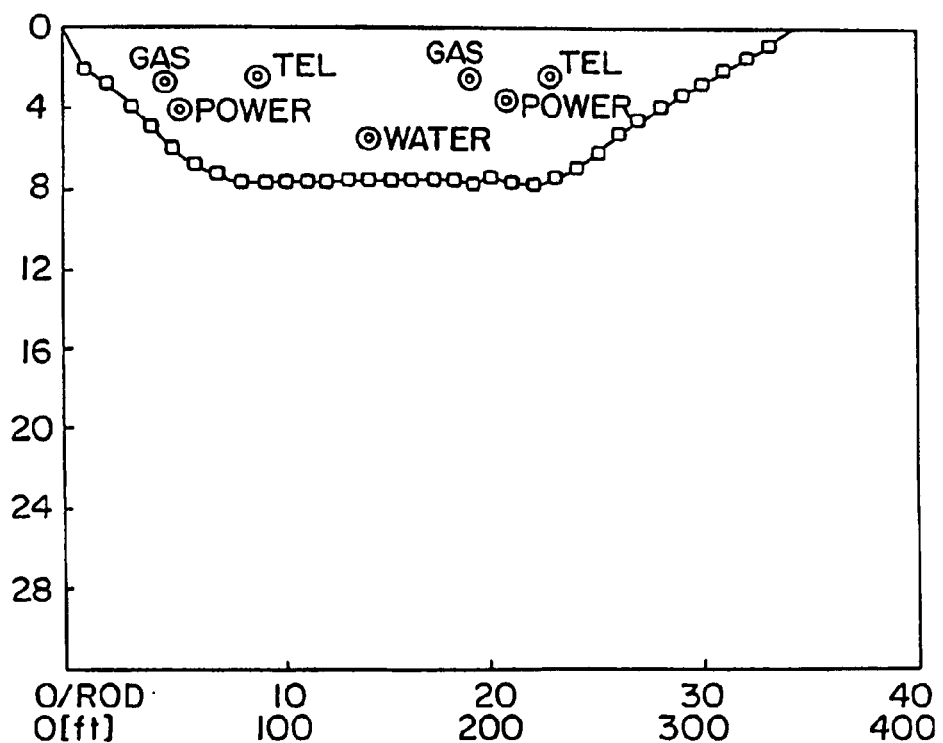
FIG. 10 is an exemplary bore plot generated in accordance with an embodiment of the present invention.

Thus, as rods are expended and depth data is recorded, depth data associated with selected locations along the bore is compiled. Accordingly, a bore map may be generated at display 34 or, for example, at a personal computer included with monitor 32, as illustrated in FIG. 10. The vertical axis of the plot of FIG. 10 indicates feet below ground surface. The horizontal axis provides the length of the bore in the number of rods and rod feet. Thus, at the first extended rod, the bore illustrated was two feet deep while at the tenth rod the bore was nearly eight feet. Of course, the cumulative data may be presented in a variety of fashions, for example in tabular form. Accordingly, any and all suitable methods of identifying the compiled data should be understood to be within the scope of the present invention.

A system including the above described mapping capabilities is the MOLE MAP™, marketed by McLaughlin Manufacturing Company, Inc., 2006 Perimeter Road, Greenville, S.C. 29605. This system includes the capability to change the units at which depth measurements are taken. For example, in programming CPU 53, keys on keyboard 60 may be used to adjust the length of the rods in a boring system. Thus, by adjusting the rod length utilized by CPU 53, an operator may configure the system to record depth measurements at a partial rod length or at multiple rods. As the predetermined number of rods are expended, the operator would then press the "set" key on keyboard 60 to record the depth data at that point. Of course, those of ordinary skill in the art should understand that it is possible to create a control system that would automatically record the depth data received from receiver 22 as the rods are expended. As noted above, a map may be generated as in FIG. 10 at display 34 or at a PC included with monitor 32 as indicated in FIG. 6. The plot data is provided to the PC via driver 62 and RS-232C connector 63 as indicated. Alternatively, monitor 32 may be embodied by a PC device. The information may be provided to the PC in real time as the depth data is recorded by operator 36 via keyboard 60. Furthermore, a cumulative plot stored in EEPROM 61 may be downloaded to PC and printer via connector 63. It should be understood, however, that monitor 32 may or may not include a PC.

As discussed above, the present system may be used to map existing utilities. In such a configuration, CPU 53 may be programmed to receive depth data in intervals of actual ground distance. Thus, an operator 38 as in FIG. 1 traces the existing utility with receiver 22. As the operator moves away from a starting point, operator 36 records depth data on a monitor at predetermined intervals from the starting point. Thus, a map of an existing utility similar to the map shown in FIG. 10 may be generated. However, the horizontal axis would be structured in terms of actual distance rather than rod lengths. Monitor 32, via CPU 53 or a personal computer, may be configured to merge existing utility plots with a boring system plot. Of course, the horizontal axis of either the boring system plot or the utility plot must be converted so that the maps are compatible.

Referring again to FIG. 10, existing utilities running perpendicular to the new bore are indicated. Such utilities are known utility positions which the new bore must avoid. Accordingly, the ability of operator 36 (FIG. 1) to view a bore plot as the bore is being made enables the operator to control the directional boring head by controls 20 to avoid such existing utilities.

Figure 13A:
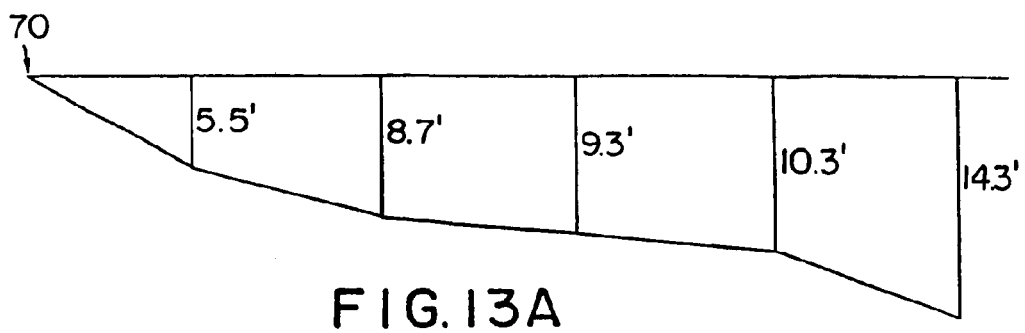
FIG. 13A is a partial graphical representation of a depth measurement procedure practiced in accordance with an embodiment of the present invention.
Figure 13B:
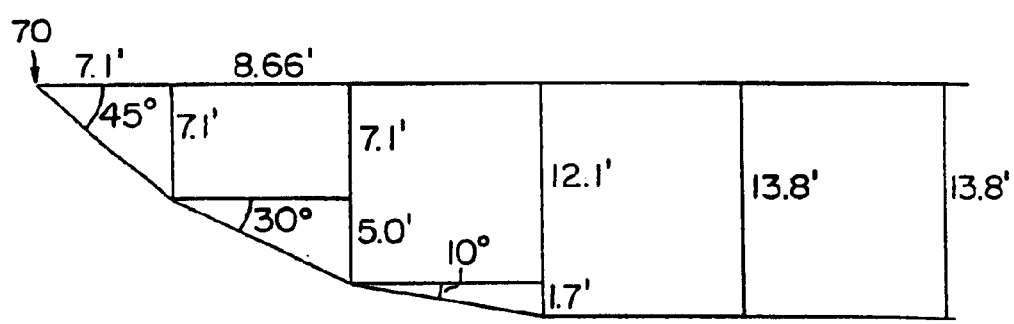
FIG. 13B is a partial graphical representation of a depth measurement procedure practiced in accordance with an embodiment of the present invention.

As noted above, stationary receiver devices may be used in preferred embodiments of the present invention to generate a boring system plot. One method of measuring bore depth with respect to the ground surface in such a system utilizes the pitch angle of the directional boring head. Referring to FIG. 13B, a bore is graphically illustrated beginning at ground level at 70. The first ten foot rod section is expended at a 45° angle, and, thus, the depth of the bore at the first rod is 7.1 feet as shown. The pitch angle at the directional boring head may change as new rods are expended. In FIG. 13B, the pitch angles at the second, third, fourth, and fifth rods were 30°, 10°, 0°, and 0°, respectively. The depths at these points are 12.1 feet, 13.8 feet, 13.8 feet, and 13.8 feet, respectively.

This depth information may be transmitted from a stationary receiver device to a monitor device for use in generating a bore plot as described above. Again, the horizontal axis may be presented either in terms of expended rods (FIG. 10) or in actual ground distance. For example, if a plot were generated from the depth information of FIG. 13B, a depth of 7.1 feet would be marked at 1 rod (or 10 feet if a rod is 10 feet long) while a depth of 12.1 would be marked at 2 rods. If the plot is presented in terms of ground distance, a depth of 7.1 feet would be marked at 7.1 feet from starting point 70 while a depth of 12.1 feet would be marked at 15.76 feet from point 70.

Figure 13C:
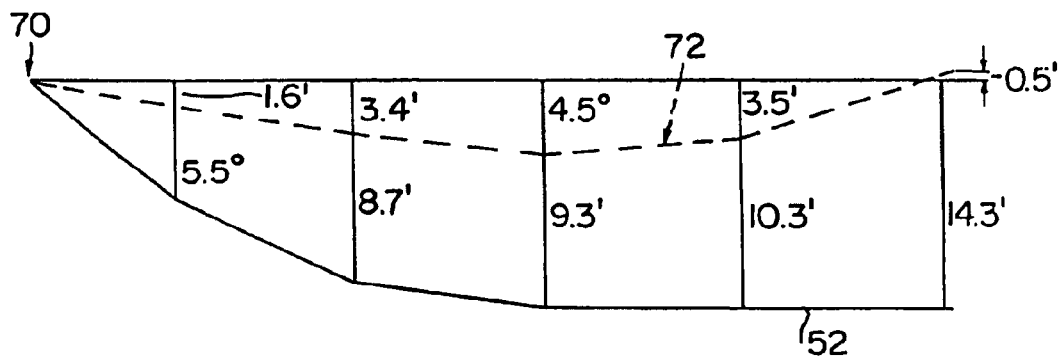
FIG. 13C is a partial graphical representation of a depth measurement procedure practiced in accordance with an embodiment of the present invention.

An accurate plot may be generated from the information as in FIG. 13B if the ground surface is substantially level. If the bore is made below a ground surface that is not level, the depth information of FIG. 13B must be modified if an accurate plot is to be obtained. For example, FIG. 13A graphically represents exemplary depth measurements made at each of the rod positions along the bore represented in FIG. 13B by, for example, a portable measurement device as described above. The depth data from FIG. 13B may then be modified to determine the position of the bore 52 with respect to an actual ground surface line 72 as illustrated in FIG. 13C. The adjustment may be made by a central processing unit such as CPU 53 as in FIG. 6.

It should also be understood by those of ordinary skill in the art that receiver 22 may also be configured to compile the data associated with the selected locations as described above with respect to monitor 32. That is, monitor 32 may be at least partially embodied by a receiver 22. This may be particularly advantageous in systems where only a utility plot is desired. In such case, a transmitting source radiates the location signal from the bore as described above, while a single portable unit may be used to receive the location signal, measure the depth, and compile the depth data associated with the selected location. Thus, a single apparatus would encompass the receiver device, measurement device and monitor device. Of course, in a directional boring system as shown in FIG. 1, receiver device 22 may be configured to simultaneously provide the same display as presented to the operator 36 at monitor 32.

Figure 15:
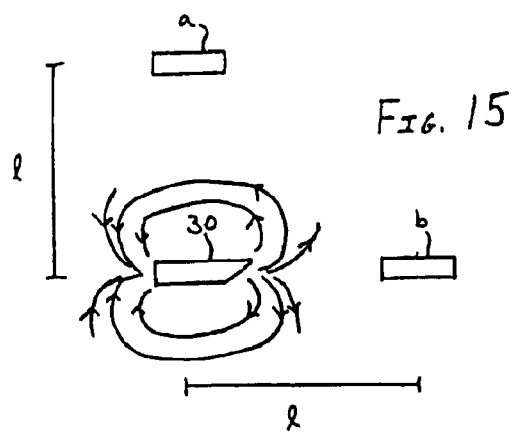
FIG. 15 is a schematic illustration of a boring head and two receiving coils.
Figure 16:
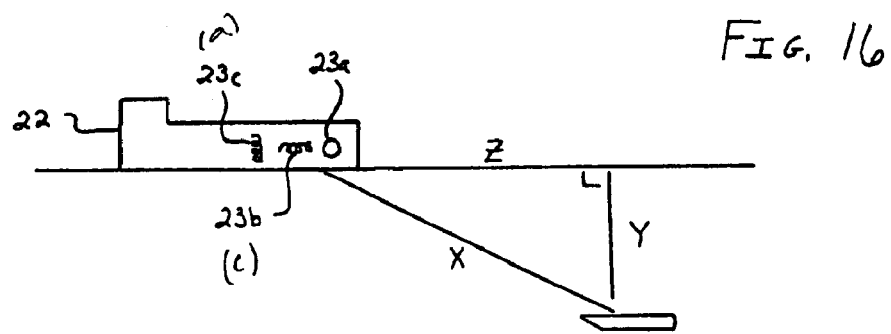
FIG. 16 is a schematic illustration of a receiver and boring head for use in a system in accordance with an embodiment of the present invention.

The receiver may also be used to measure a diagonal distance between probe 30 and receiver 22. Referring to FIG. 15, the measurement is based on the relationship between the probe and two coils. For example, if a probe 30 radiates a dipole magnetic field, indicated at 96, and coils a and b are disposed at equal distances from probe 30 as shown in the figure, the magnitude of the induced signal across coil a is twice the magnitude of the signal induced across coil b. Referring now to FIG. 16, receiver 22 is placed on the ground so that coil 23b is aligned with the probe 30. Where $V_1$ in the calibration voltage discussed above, $V_2$ is the magnitude of the induced signal on coil 23b, and $V_3$ is the magnitude of the signal induced across coil 23c, $$V_4 = ((V_3)^2/(V_2)^2)^{0.5}.$$

The distance X between probe 30 and receiver 22 is:

$$X = 10 \text{ ft}(V_1/2V_4)^{-3}$$

The diagonal measurement X may be used to locate probe 30 when the probe is below a surface, such as a busy road or a body of water, in which the operator is unable to carry receiver 22. As discussed above, the probe's position, including the depth Y below the ground surface, may be determined through measurements of the probe's pitch angle at each rod section. Assuming that the ground surface is approximately level between receiver 22 and probe 30, the horizontal distance Z between the probe and the receiver is $(X^2-Y^2)^{0.5}$. The receiver's CPU may perform this calculation and present the result at the receiver's display.

Accordingly, an operator may place the receiver at the edge of the road or body of water and determine how far the probe has yet to travel to reach the edge.

Figure 18A:
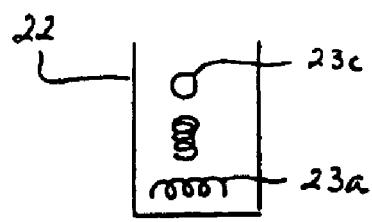
FIG. 18A is a schematic illustration of a receiver and boring head for use in a system in accordance with an embodiment of the present invention.
Figure 18A:
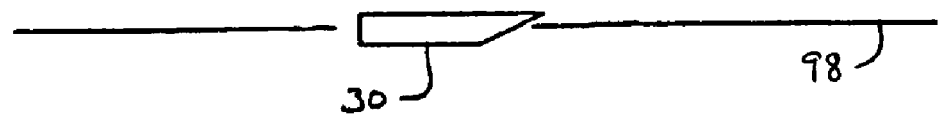
Figure 18B:
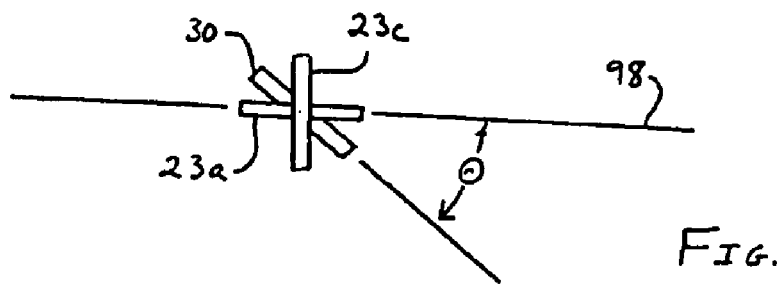
FIG. 18B is a schematic illustration of the position of a pair of receiver coils and a boring head in determining yaw in accordance with an embodiment of the present invention.

Referring to FIGS. 18A and 18B, receiver 22 may be used to determine the yaw of probe 30 with respect to its intended path of travel 98. The operator holds receiver 22 in a vertical position above probe 30 so that coil 23a is aligned with path of travel 98. As shown in FIG. 18B, coil 23c is therefore perpendicular to path 98. The angle $\Theta$ is equal to arctan $(V_1/V_2)$, where $V_1$ is the magnitude of the signal induced in coil 23c, and $V_2$ is the magnitude of the signal induced in coil 23a.

Referring again to FIG. 18A, the yaw calculation loses accuracy, but may still be effective, where receiver 22 is moved forward or back along path 98 or directly laterally from path 98. The acceptable distance from the probe depends on the probe's depth and the amount of accuracy reduction the operator is willing to accept. An operator may use this feature in guiding the boring tool. For example, an operator moving forward along path 98 ahead of probe 30 may monitor the yaw of the probe as it follows underground. Assuming the yaw reading is zero degrees as the operator moves away from the probe, the yaw will remain zero degrees during drilling if the probe remains on course. A change in the yaw instantly tells the operator the appropriate angle by which the drilling tool is moving off course, and the drilling head may then be turned back toward its intended course.

Figure 17A:
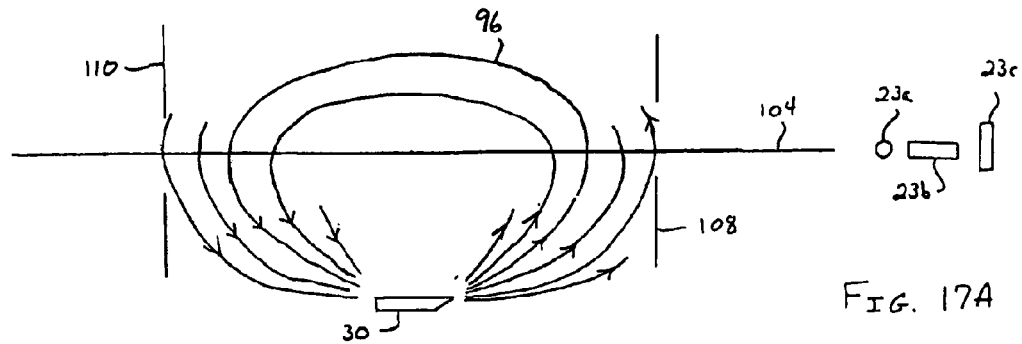
FIG. 17A is a schematic illustration of a receiver and a boring head for use in a system in accordance with an embodiment of the present invention.

The receiver may also be used to determine the probe's lateral deviation from its intended path using two perpendicular coils, one of which is aligned with the probe's intended path and one of which is horizontally aligned perpendicular to the path. This method is effective where the receiver is sufficiently in front of the probe. Where the probe is close to or in front of the receiver, the method is effective if the operator knows the relative positions of the probe and receiver along the probe's desired path. Referring to a side view of receiver 22 on a ground surface 104 presented in FIG. 17A, a locating coil (23a) is aligned with horizontally perpendicularly to the probe's path of travel. Coil 23b, which is aligned with the probe's path, is the reference coil. Referring also to FIG. 17B, magnetic field 96 induces a signal 106 in coil 23b. When coil 23b is in front of a line 108 at which the flux lines of field 96 pass perpendicularly through the coil, signal 106 has a phase as referenced to the left of line 108 in FIG. 17B. As probe 30 moves beyond this point, so that coil 23b is between line 108 and a line 110 at which the magnetic flux lines behind the probe pass perpendicularly though the coil, signal 106 changes phase by 180 degrees. As the probe continues, so that coil 23b moves behind line 110, signal 106 returns to its original phase.

Figure 17C:
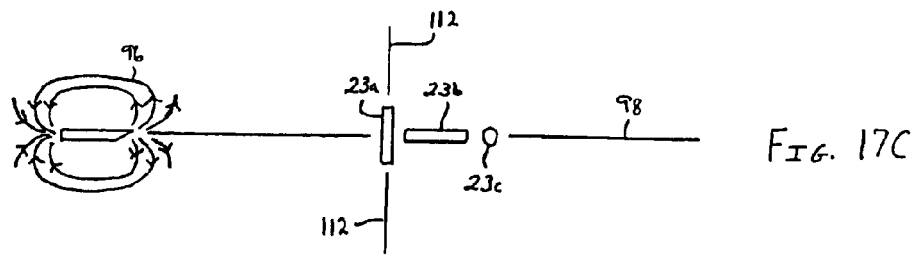
FIG. 17C is a schematic illustration of a receiver and a boring head for use in a system in accordance with an embodiment of the present invention.
Figure 17B:
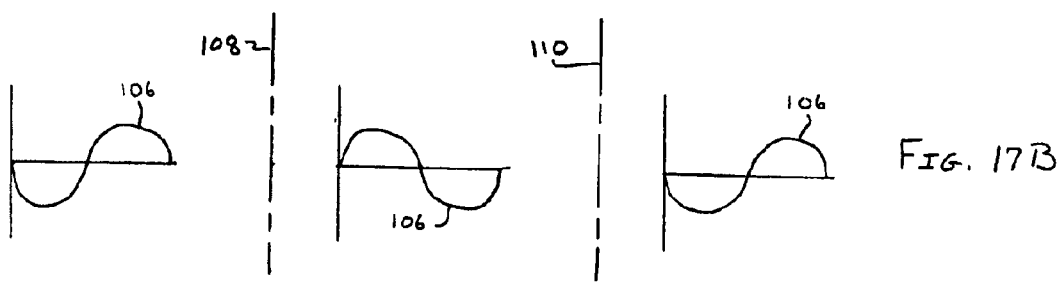
FIG. 17B is a graphical representation of signals induced in a receiver coil for use in an embodiment of the present invention.

FIG. 17C is a top view of probe 30 with respect to receiver 22, which is aligned parallel to the probe's intended path of travel 98. Probe 30 induces a signal in coil 23a if probe 30 is to the left or right of path 98. The phase of the induced signal, however, depends upon whether the probe is before or beyond, with respect to path 98, a line 112 aligned with coil 23a. Referring also to the left hand side of FIG. 17D, if probe 30 is before line 112, an induced signal 114 in coil 23a can have either of two opposite phases depending on whether it is to the left or right of path 98. When the probe passes beyond line 112, signal 114 changes phase by 180 degrees. That is, the phase of signal 114 changes across both lines 98 and 112.

Referring now to FIGS. 17A–17D, the probe's lateral position with respect of its intended path of travel 98 is described by a comparison of signals 106 and 114. This comparison depends, however, on the relative position of the probe and the receiver. If probe 30 and receiver 22 are disposed so that coil 23b is in front of line 108 (the probe is therefore also before line 112), a relationship between the signal on coil 23a and the signal on coil 23b describes the probe's lateral position. If signal 106 is in phase with signal 114, the probe is to the left of line 98. If the signals are out of phase, the probe is to the right of line 98. That is, the probe is to the left of its intended path if the signal in the locating coil is in phase with the reference signal and is to the right of path 98 if the signals are out of phase. This relationship between the locating and reference signals is hereinafter referred to as the "direct" relationship, although it should be understood that use of the terms "direct" and "inverse" to describe phase relationships herein is for purposes of explanation only. It should also be understood that the relative phase between any two coils also depends upon the orientation of the signal measurement across the coils. Of course, such physical arrangements will be known for a given receiver, and the receiver's CPU may be programmed accordingly.

The opposite relationship, hereinafter referred to as the "inverse" relationship, is demonstrated between lines 108 and 112. Here, signals 106 and 114 are out of phase when the probe is to the left of line 98 but are in phase when the probe is to the right. Between lines 112 and 110 signals, 106 and 114 return to the direct relationship. As coil 23b moves beyond line 110, the signals revert to the inverse relationship.

As indicated in FIGS. 17A–17D, the operator and/or the receiver's CPU must know the relative position of the receiver and the probe with respect to path 98 where the determination of the probe's lateral position with respect to line 98 is based only on the phase relationship between the signals induced on coils 23a and 23b. Where the receiver is sufficiently in front of the probe, so that coil 23b is in front of line 108, the CPU may rely on the direct relationship, and this can be the default relationship to which the CPU is programmed. A button may be provided at the receiver by which the operator may change the CPU to base its determination on the inverse relationship. To effectively use this feature, however, the operator must know the relative position of the receiver and the probe to switch between the modes at the crossings of lines 108, 112 and 110.

Figure 17D:
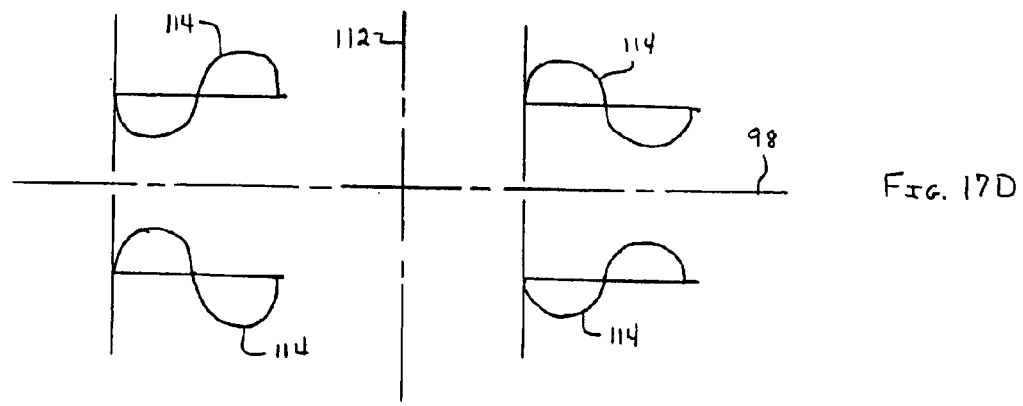
FIG. 17D is a graphical representation of signals induced in a receiver coil for use in an embodiment of the present invention.
Figure 17E:
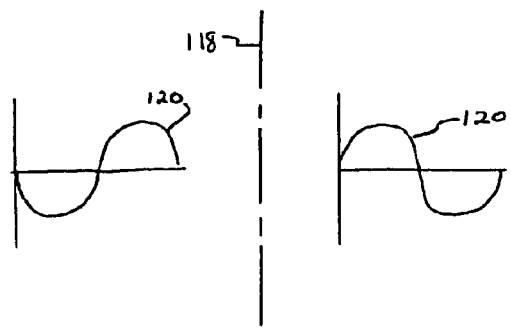
FIG. 17E is a graphical representation of signals induced in a receiver coil for use in an embodiment of the present invention.

Referring again to FIG. 17A, and also to FIG. 17E, the inclusion of coil 23c eliminates the need for the operator or the CPU to know the relative position of the probe and the receiver with respect to the intended path. As probe 30 moves up to and past a line 118 aligned with coil 23c, magnetic field 96 induces in the coil a signal 120 that changes phase by 180 degrees as the probe passes line 118. Referring also to FIG. 17C, lines 112 and 118 are separated by the distance separating coils 23a and 23c. This distance is, however, relatively small, and for the purposes described herein the lines may be considered aligned with each other. Under this treatment, comparison of FIGS. 17D and 17E shows that the direct relationship applies between signals 120 and 114 regardless of the relative position of probe 30 and receiver 22 with respect to path 98. Thus, where coil 23c is the reference coil, the receiver's CPU may determine whether the probe is to the left or to the right of path 98 using the direct relationship at all times. Accordingly, in one embodiment of the present invention, the receiver's CPU may be programmed to employ this relationship.

Figure 17F:
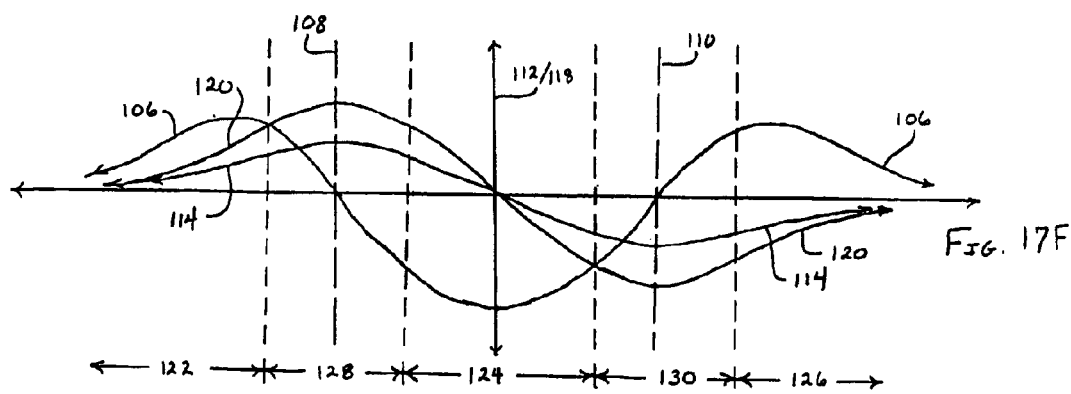
FIG. 17F is a graphical representation of signals induced in receiver coils for use in an embodiment of the present invention.
Figure 17G:
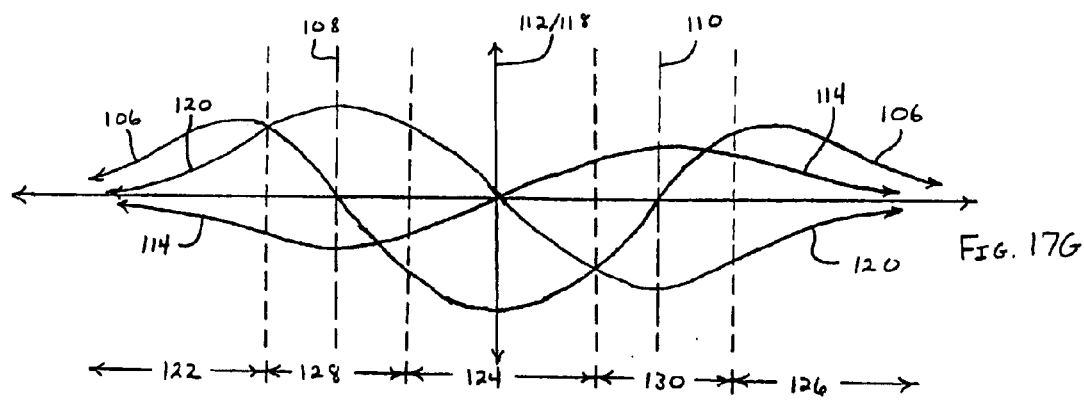
FIG. 17G is a graphical representation of signals induced in receiver coils for use in an embodiment of the present invention.

Because signals 114 and 120 both go to zero when the probe reaches the receiver, the receiver in one preferred embodiment selects either coil 23b or 23c as the reference coil, depending on the coils' relative signal strength. FIGS. 17F and 17G illustrate the magnitudes of signals 106, 114 and 120 as the probe and the receiver move in parallel past each other and across lines 108, 112/118 and 110. The horizontal axis in each figure describes the relative longitudinal position between the probe and the coils. The vertical axis describes the magnitude of the signals induced on the coils. The position of a signal line above or below the horizontal line reflects the signal's phase, and this provides the difference between the figures. In FIG. 17F, the probed is always to the left of line 98 (FIG. 17C), while in FIG. 17G, the probe is to the right. Since the probe's lateral position with respect to line 98 determines the phase of the signal on coil 23a, the phase of line 114 changes by 180° from FIG. 18F to FIG. 17G. These figures again illustrate that, as in the embodiment described above, the probe's lateral position relative to line 98 may be determined from a comparison of the phase of signals 114 and 120 alone. The plots in FIGS. 17F and 17G are provided for purposes of explanation and are not to scale.

In this embodiment, the receiver's CPU monitors the magnitude (the absolute value) of signals 106 and 120 and chooses the reference coil depending upon which signal has the greater magnitude. That is, if the magnitude of 106 is greater than that of signal 120, coil 23b is the reference coil. On the other hand, coil 23c is the reference coil when signal 120 has the greater magnitude. Accordingly, coil 23b is the reference coil in zones 122, 124 and 126 shown in FIGS. 17F and 17G, and coil 23c is the reference coil in zones 128 and 130.

As discussed above, however, a comparison of induced signals alone is insufficient to determine the lateral position of the probe with respect to the receiver when coil 23b is the reference coil. Accordingly, the receiver's CPU also monitors the relative phase between signal 106 induced in coil 23b and signal 120 induced in coil 23c. At those times when coil 23b is chosen as the reference coil (i.e. in zones 122, 124 and 126), the use of the direct and inverse relationships between signal 114 and signal 106 depends on the relative phase between signal 106 and signal 120. If signal 106 is in phase with signal 120, the CPU uses the direct relationship between signal 106 and signal 114 to determine the probe's lateral position. If signal 106 is 180° out of phase with signal 120, the CPU uses the inverse relationship between signal 106 and signal 114 to determine the probe's lateral position. When the CPU detects that signal 106 and signal 120 are out of phase, the CPU may reverse the polarity of the measurement access coil 23b and use the direct relationship between signals 106 and 114.

Coil 23c is the reference coil in zones 128 and 130. As discussed above, the CPU always uses the direct relationship between signals 120 and 114 in determining the probe's lateral position when coil 23c is the reference coil.

Upon determining the probe's lateral position with respect to line 98 (FIG. 17C), the receiver's display 24, and/or the monitor's display 34, displays an arrow indicating which direction the probe needs to move in order to regain line 98. That is, when the receiver is aligned with line 98 as shown in FIG. 17C, the display arrow points to the right when the probe is left of line 98 and points to the left when the probe is to the right of the line.

Figure 22:
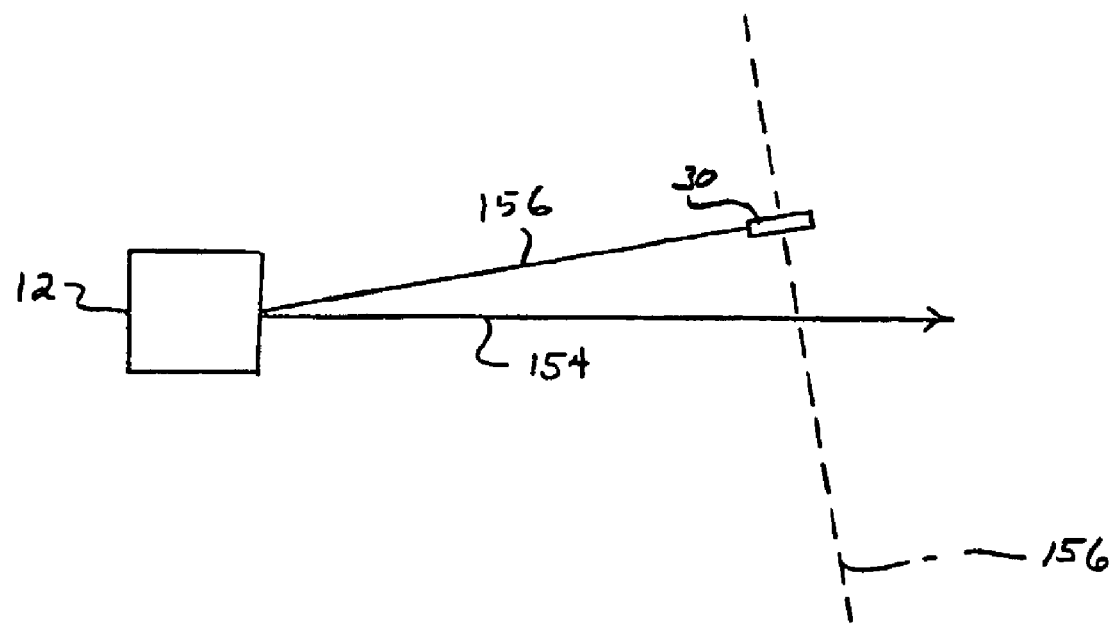
FIG. 22 is a schematic top view of a boring machine, a probe in a below-ground boring tool, and a path taken by an above-ground operator locating the probe according to a method in accordance with an embodiment of the present invention.

Referring to FIG. 22, an operator may locate the ground position of probe 30 using the above-ground receiver 22 (FIG. 1). Starting at drilling machine 12, the operator activates the receiver's locating mode and begins walking toward the position he believes the probe to be. That is, he begins walking along a path 154 he believes to be longitudinally aligned with the probe. Of course, the operator's path likely diverges from the probe's underground longitudinal line (i.e. the axis of the magnetic field radiated by the probe), indicated in FIG. 22 at 156. By starting at the drilling machine, however, the operator can make a reasonable estimate of the probe's longitudinal line and can carry the receiver so that the axis of coil 23c (FIG. 1) is aligned at an oblique (i.e. parallel or less than 90°) angle with respect to the probe's longitudinal line. Preferably, this oblique angle is within a range from 0° to 45°.

Figure 20:
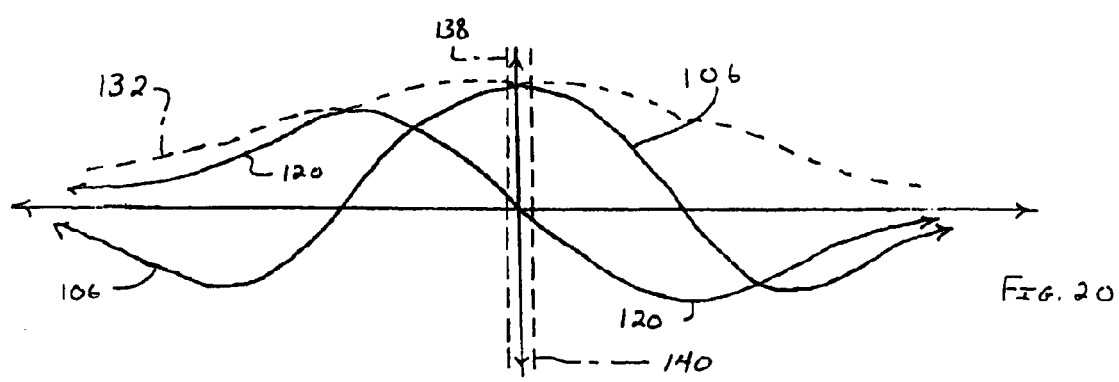
FIG. 20 is a graphical representation of signals induced in receiver coils for use in an embodiment of the present invention.
Figure 21:
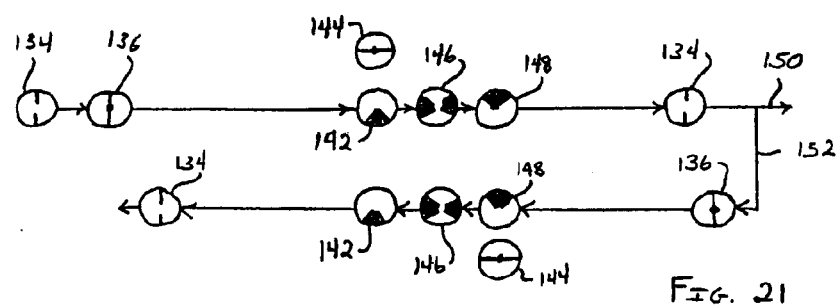
FIG. 21 is a schematic illustration of display icons provided by a receiver constructed in accordance with an embodiment of the present invention.

As the operator walks, he views the receiver's display. Referring also FIGS. 20 and 21, the display provides a sequence of icons as shown in FIG. 21, which are in turn based on signals 106 and 120 induced in coils 23c and 23b, respectively, by the probe's magnetic field. Assuming that the receiver is in its vertical position as shown in FIG. 19B, FIG. 20 illustrates signals 106 and 120 as the receiver moves up from behind the probe along line 154 to a line 156 extending laterally from the probe, and then beyond the lateral line. To the left of the vertical axis in FIG. 20, the receiver is behind lateral line 156. To the right of the vertical axis, the receiver is in front of the lateral line.

A line 132 in FIG. 20 illustrates the square root of the sum of the squared values of lines 106 and 120. The receiver's CPU determines this value as the operator moves along line 154. Initially, when the operator activates the receiver's locating mode, the receiver's display shows an icon 134. As the operator moves, the receiver monitors the value represented by line 132. If line 132 decreases, meaning that the operator is moving away from the probe, icon 134 does not change. This informs the operator that he is moving away from the probe. If the operator moves toward the probe, line 132 increases, and the receiver changes icon 134 to icon 136, thereby notifying the operator that he is moving toward line 156.

The receiver also monitors a comparison value that is equal to the strength of signal 120 divided by the strength of signal 106. If signals 106 and 120 are out of phase with each other, this value is negative. If the signals are in phase, the comparison value is positive. As indicated in FIG. 20, the greatest divergence between signals 106 and 120 occurs when the receiver is on line 156, and the magnitude of signal 120 only falls below 10% of the magnitude of signal 106 within a relatively small distance on either side of the line, as indicated by lines 138 and 140.

While moving along line 154 toward line 156 from behind, the comparison value falls below 10% as the receiver reaches line 138. At this point, icon 136 changes to an icon 142 informing the operator that the receiver is close to and behind the probe's lateral line. Alternatively, the display may provide a position-neutral icon 144 to simply inform the operator that the receiver is near the line. As the operator continues forward, the comparison value drops below 6%. At this point, icon 142 changes to an icon 146, indicating that the receiver is directly over line 156.

As the operator continues beyond and in front of the probe, the comparison value becomes negative. When the comparison value falls below −6%, icon 146 changes to an icon 148 that informs the operator he has now moved in front of the lateral line. If the operator continues moving forward, icon 148 changes to icon 134 when the comparison value falls below −66%.

If the operator continues to move forward, as indicated at arrow 150 in FIG. 21, line 132 continues to decrease, and the receiver's display continues to provide icon 134. If the operator carries the receiver back toward the lateral line, as indicated at arrow 152, line 132 increases, and the receiver again provides icon 136 and monitors the comparison value. When the comparison value rises above −10%, the receiver displays icon 148 or 144. As the operator moves directly above the lateral line, and the comparison value rises above −6%, the receiver again displays icon 146. As the operator moves behind the probe, and the comparison value rises above 6%, the receiver displays icon 142, which returns to icon 134 when the comparison value rises above 66%.

Once the operator locates lateral line 156, he can follow the line to the probe. To stay on the line while walking, the operator watches the receiver's display and maintains a path so that the display continues to show icon 146. Of course, at the time he locates line 156, the operator doesn't know whether he should move to the left of right along the line. This information is provided by an indicator on the receiver's display that is proportional to the magnitude of the signal induced on coil 23c, which is held perpendicular to line 156 and therefore parallel to the probe. When this indicator reaches a maximum, and the display also shows icon 146, the receiver is directly above the probe. The operator may then accurately determine the probe's heading using the yaw measurement described above.

Using the above-described method, the operator may locate the bore. It should be understood, however, that the comparison value ranges may vary as desired.

It should be understood that modifications and variations of the present invention may be practiced by those of ordinary skill in the art without departing from the spirit and scope of the present invention, which is more particularly set forth in the appended claims. Furthermore, those of ordinary skill in the art will appreciate that the foregoing description is by way of example only, and is not intended to limit the invention so further described in such appended claims, and that the aspects of varying embodiments may be interchanged in whole or in part.

What is claimed is:

1. A method for locating a horizontal bore below a ground surface, said method comprising:

radiating a magnetic field from said bore using a transmitting source positioned therein;

arranging a receiver remote from said transmitting source having a plurality of coils disposed so that each one of the coils occupies a predetermined operative position with respect to a horizontal plane when said receiver is disposed in a first position with respect to said horizontal plane and so that at least a first one of the coils moves into said operative position of a second one of said coils when said receiver is rotated to a second position with respect to said horizontal plane, said coils generating a plurality of signals induced on the coils by said magnetic field;

providing a processor for using at least a first signal and a second signal produced by respective first and second ones of said coils induced on the coils by said magnetic field; and configuring a control circuit for selectively transferring the first and second signals to the processor by detecting one of the first position and the second position of the receiver arrangement and routing the second signal to the processor in place of the first signal when the receiver is in said second receiver position.

2. The method of system as in claim 1 including providing a plurality of said first coils.

3. The method of claim 1 including offsetting said second position of said receiver at least approximately 90° from said first position of said receiver.

4. The method of claim 1 including using a tilt switch in the control circuit to detect the first and second positions of the receiver.

5. The method of claim 1 including using the control circuit to multiplex the first and second signals from the first and second coils to the processor.

6. The method of claim 5 including configuring said control circuit to include a tilt switch that outputs a signal to said processor that changes state between said first position of said receiver and said second position of said receiver, and controlling multiplexing of the first and second signals responsive to said tilt switch signal so that, when said tilt switch signal is in a first said state, said first signal is directed to a first multiplexer output and said second signal is directed to a second multiplexer output and, when said tilt switch signal is in a second said state, moving said first signal of said first coil to said second multiplexer output to replace said second signal.

7. The method of claim 1 wherein said first coil and said second coil define a first coil axis and a second coil axis respectively and supporting the first coil axis and the second coil axis in an orthogonal relationship.

8. The method of claim 7 including providing a plurality of said first coils as part of said receiver.

* * * * *